July 24, 1956 G. L. HAYWOOD 2,755,607
COATED ABRASIVES

Filed June 1, 1953 2 Sheets-Sheet 1

INVENTOR
GEORGE L. HAYWOOD

BY Carroll Palmer
ATTORNEY

July 24, 1956  G. L. HAYWOOD  2,755,607
COATED ABRASIVES
Filed June 1, 1953  2 Sheets-Sheet 2
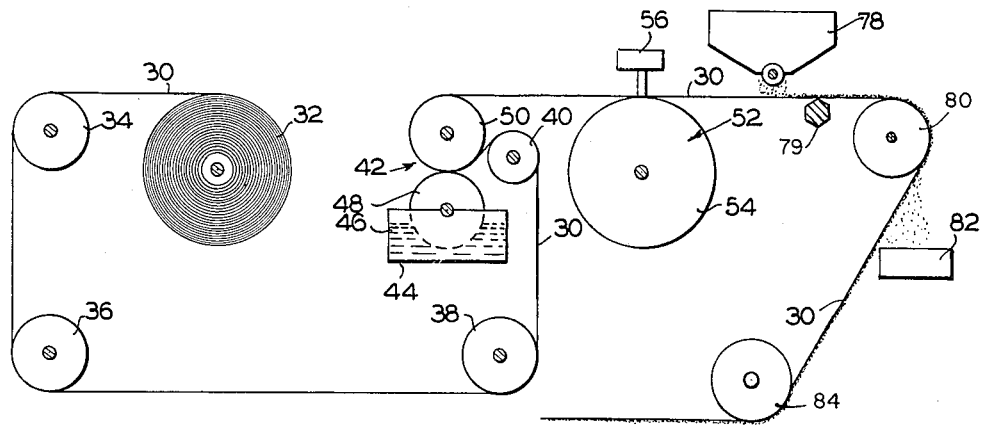
Fig. 7.
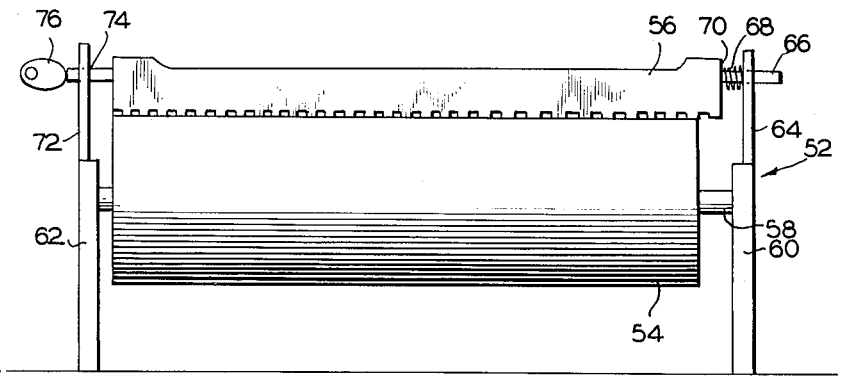
Fig. 8.
Fig. 9.
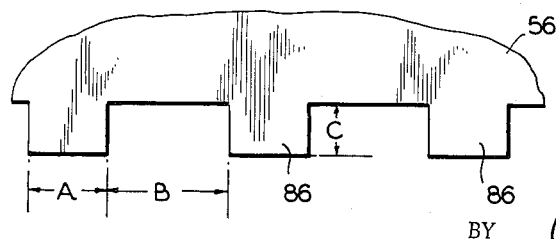
INVENTOR
GEORGE L. HAYWOOD
BY Carroll Palmer
ATTORNEY United States Patent Office 2,755,607
Patented July 24, 1956

2,755,607

COATED ABRASIVES

George L. Haywood, Latham, N. Y., assignor, by mesne assignments, to Norton Company, Worcester, Mass., a corporation of Massachusetts Application June 1, 1953, Serial No. 358,656

9 Claims. (Cl. 51—185)

This invention relates to coated abrasives ("sandpaper"). More particularly, it relates to coated abrasives having a uniform pattern of grooves or indentations in the abrasive surface and to processes for the production of such materials.

Field of invention

The general public is familiar with the product popularly referred to as "sandpaper." Technically this type product is called "coated abrasive" because a large part of it is not made with paper, but with cloth, and also because sand is seldom the abrasive grain used in the production of such materials. However, it will probably always be called "sandpaper" by a large number of people.

Coated abrasives can be subdivided into two broad classes. The first, known as the "closed coat" type, is the most familiar. It is the kind in which the abrasive grain is spread densely across the surface of the product presenting an almost continuous surface of abrasive grain. The second broad class, but less familiar to most people, is the "open coat" type in which the abrasive grain is thinly spread over the surface of the product so that there are relatively large, open spaces between each abrasive grain.

In both the open coat and closed coat type of coated abrasive, the abrasive grain is spread uniformly on the surface of the product, i. e. no attempt is made to have the grain be more concentrated at one point than at another or for there to be any predetermined areas uncoated with grain. Hence such products present no perceptible surface pattern.

Manufacturers of coated abrasives are constantly trying to find ways of modifying coated abrasives in order that the abrading efficiency and usefulness of the products can be improved or extended. For example, the open coat type of product is a recent development as compared with the closed coat type and was discovered to be superior to the closed coat type for many operations, particularly where the material being abraded or sanded had a tendency to glaze or fill up the abrasive surface. The open coat type in many cases has been found to have much less tendency to fill with abraded material and thus to possess extended life as compared with use of a closed coat type material for the same abrading operation.

Other attempts have been made to improve the quality and efficiency of coated abrasives by making changes in the manner of distribution of abrasive grain over the surface of coated abrasives. For example, coated abrasives have been formed with an abrasive surface having alternate abrasive and non-abrasive portions defined in a predetermined pattern. Such patterned surface products have been made by applying an adhesive layer to a backing, spreading abrasive grain on the adhesive and then scraping away lines of adhesive and grain while the adhesive is still in a softened condition. Such a process for forming a patterned-surface coated abrasive is disclosed in U. S. 1,657,784.

U. S. Patent 2,108,645 also describes other methods for forming a patterned-surface coated abrasive. According to the processes of this patent, products are made with alternate abrasive and non-abrasive portions by one of two general methods. In one method, adhesive is applied only at selected areas by the use of an embossed or engraved roll and abrasive grain is only held on the surface of the backing sheet at these adhesive coated areas. In the other method, adhesive is spread over the entire surface of the backing sheet, but then abrasive grain is applied only at selected areas leaving portions of the adhesive layer uncoated with abrasive grain.

The known methods described above are designed to produce coated abrasives which are modifications of the open coat type product which will give increased efficiency for certain types of operations because the glazing or filling of the abrasive surface in the specific operation is avoided or diminished.

There is another form of coated abrasive having a patterned surface known as "fillet cloth." This type product is made principally for the textile industry to sharpen needles of carding machines. It may be made with a single layer of abrasive grain, but more commonly is "double-coated," i. e. made by applying first an adhesive layer, then a layer of grain, another adhesive layer, a section layer of abrasive grain and finally a sizing adhesive coat. A pattern of ridges and grooves is formed in the fillet cloth after the abrasive grain has been applied by running a scraper through the abrasive grain adhesive matrix while it is soft, or better still, by rolling a series of sharp edged discs through the matrix forcing down the adhesive and grain at each point where the edge of a disc contacts the matrix. Hence, in this type of product, while the density of the abrasive grain is substantially uniform across the area of the product, the orientation of the grain is quite different between the grooves and the ridges since the groove-forming means knocks the grain over and pushes it into the adhesive layer when the groove is formed.

There is yet another type of patterned-surface coated abrasive. This is made by taking usual, flat surface coated abrasive and running it through embossing rolls to form indentations in the backing sheet and, in turn, in the abrasive surface. In contrast to the patterned-surfaced coated abrasives mentioned above, in which the backing sheet is undented, this type product has a grooved backing as well as a grooved surface. Hence, the patterned surface is not too permanent because pressure can quite easily undo the shaping accomplished by the embossing.

While the prior known types of coated abrasives as described above which have patterned surfaces have certain advantages for special uses, still the described processes and the resulting products have not been found to provide coated abrasives having any universal or outstanding increase in efficiency or mode of operation. Furthermore, these patterned materials have certain disadvantages, e. g. they may give a streaky appearance to the surface abraded with them and they may stretch greatly during use because of the presence of uncoated areas or indentations in the backing.

Objects

A principal object of the present invention is the provision of a basically new type of coated abrasive. Further objects include:

1. The provision of new processes for the formation of patterned-surface coated abrasives.
2. The provision of patterned-surface coated abrasives having substantial uniformity in density and orientation of abrasive grain across the entire abrasive surface of the product.

3. The provision of new forms of coated abrasives which exhibit a new and unusual type of grinding or sanding efficiency.

4. The provision of a new process for the production of patterned-surface coated abrasives which may be adopted to existing standard coated abrasive making machines with only very minor modifications of existing equipment.

5. The provision of new, patterned-surface coated abrasives which give the same finish and appearance to a surface abraded with them as regular type coated abrasives of the same grit size.

6. The provision of new patterned-surface coated abrasives which do not stretch any more than regular type coated abrasives when used, e. g. in the form of belts.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

These objects are accomplished according to the present invention through the production of coated abrasives which have a backing sheet coated on at least one side with a continuous layer of an adhesive maker coat which has a series of narrow parallel grooves, preferably all about the same thickness, alternating with a series of narrow lands between the grooves, all about the same thickness and appreciably thicker than the grooves and abrasive grain embedded in the maker coat with no appreciable difference in orientation and quantity of grain between the grooves and the lands of the patterned surface.

Preferably the product has a second adhesive coat which covers the maker coat and surrounds the grains, i. e. a sizing coat, and the grooves are all about the same size and the lands are all about the same size.

Such products are made according to the present invention by taking a suitable backing sheet, such as paper or cloth and applying a continuous layer of adhesive over the surface of the backing sheet, such as by a roller coating operation. Then, the adhesive layer while in a wet or in a softened condition is shaped into a series of parallel, narrow-width groove portions which alternate with a parallel series of land portions appreciably thicker than the groove portions without breaking the continuity of the adhesive layer, such as by combing the softened adhesive layer. Thereafter, abrasive grain is dropped or otherwise projected onto the tacky maker adhesive coat uniformly across the entire surface layer and finally the adhesive layer is hardened to fasten the abrasive grain to the backing sheet.

To make the preferred coated abrasives of this invention which have both maker adhesive layer and size coat, a second adhesive coating is applied to the resulting product after the maker coat has been hardened sufficiently to hold the abrasive grain in the oriented position in which it first is embedded in the maker coat.

The products of this invention possess a definite pattern of grooves and lands which may be straight lines, which usually run longitudinally with the coated abrasive, or a series of parallel, wavy lines, or zigzag lines. With any type pattern, the abrasive grain is distributed uniformly over the surface of the product in contrast to prior patterned surface coated abrasives such as formed by the processes of U. S. Patents 1,657,784 or 2,108,645 as explained above. Also, the orientation of the grain is not appreciably different between the grooves and the lands in contrast to the non-uniform orientation of grain in the case of fillet cloth as explained above.

It has been unexpectedely discovered that the easily obtained modification of coated abrasive structure of this invention produces a unique, unpredictable increase in the grinding or sanding ability of the coated abrasive as compared with usual form of coated abrasive of comparable type and grit number. For example, in severe edge grinding of metal plates or sheets, these new types of products may possess a 400 plus percent increase in cutting efficiency as compared with a standard control type of product. The exact reason for this unusual increase in grinding efficiency is not known although it does not appear to be related to filling or glazing factors which have been primarily responsible for increased efficiency noted in prior known patterned-surface coated abrasives.

Detailed description

The new products of this invention and their method of production can be more fully appreciated by reference to the accompanying drawings in which:

Figure 7 is a diagrammatic side view of one form of apparatus which may be used to produce the new coated abrasives of this invention.

Figure 8 is an end view of the roller and comb means of the apparatus shown in Figure 7 used to shape the adhesive maker coat in formation of coated abrasives according to the process of this invention.

Figure 9 is a side fragmentary enlarged view of the lower edge of the adhesive shaping comb of the unit shown in Figure 8.

Figure 1:
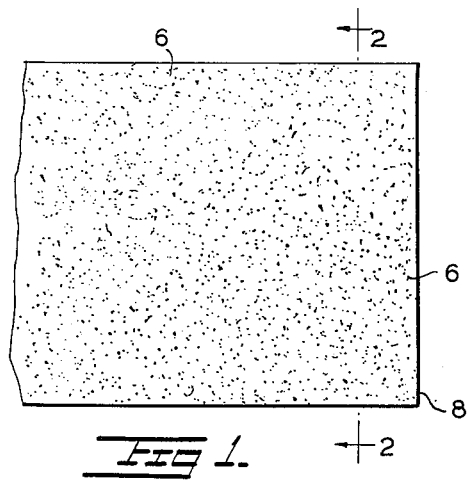
Figure 1 is a face view of the usual form of coated abrasive having a uniform, even surface of adhesive and abrasive grain.
Figure 2:
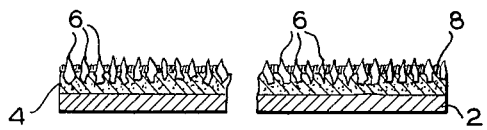
Figure 2 is an enlarged, fragmentary, cross-sectional view of the product of Figure 1 taken along the line 2—2 of Figure 1.

Referring to Figures 1 and 2 of the drawing, the normal form of coated abrasive, either of the closed coat or open coat variety, consists of a backing sheet 2, a layer of grain-holding adhesive 4, called a maker coat, abrasive grains 6 embedded in the maker coat 4 and a second adhesive coat 8 which covers the maker coat 4 and surrounds the abrasive grain 6. The adhesive coat 8 is technically referred to as a "size coat" or "sand-size coat."

As illustrated in Figure 2, the maker coat 4 and size coat 8 of normal coated abrasives are substantially uniform in thickness throughout and the abrasive grains 6 are substantially uniformly distributed across the entire area of the product. The number of grains per unit area may be high as in the case of a closed coat product, or low as in the case of an open coat product.

The difference in structure between the usual type of coated abrasive as shown in Figure 1 and products of the present invention can be appreciated by reference to Figures 3 to 6. Here the coated abrasive consists of a backing sheet 10, maker coat 12, abrasive grains 14, and size coat 16.

Figure 3:
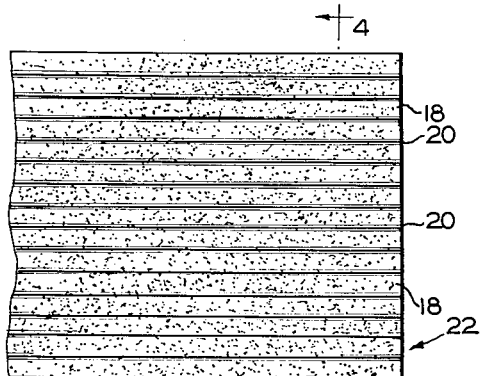
Figure 3 is a face view of coated abrasive according to the present invention in which the grooves and lands run in straight parallel lines.
Figure 4:
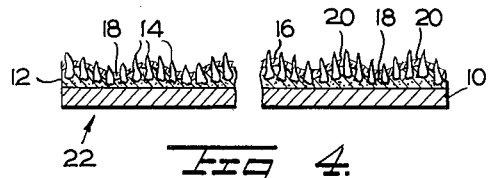
Figure 4 is an enlarged, fragmentary, cross-sectional view of the product of Figure 3 taken along the line 4—4 of Figure 3.

In the form of abrasive shown in Figures 3 and 4, the maker coat is shaped into a series of grooves 18 and lands 20 which run longitudinally of the product in straight parallel lines. In other words, the locus of midpoints of the grooves are lines which run parallel. In the preferred form of the patterns, the grooves are all about the same thickness so that these mid-point lines all lie in substantially the same plane a given distance above the top surface of the backing sheet 10. Similarly, the mid-points of the lands are lines which run parallel to one another and, preferably, lie substantially in one plane a given distance above the grooves.

The abrasive grains 14 are uniformly distributed across the area of the product. There is no appreciable difference in nature or degree of orientation of the grain between the grooves and the lands 20, and the grains 14 follow the general up-and-down pattern of the maker coat 12. The size coat 16, in contrast to the maker coat 12 is more uniform in thickness throughout than the maker coat 12 and like the abrasive grain it follows the general up-and-down contour or pattern of the maker coat 12. As a result, the final coated abrasive product 22 of Figures 3 and 4 possesses a patterned surface consisting of a series of grooves and lands resulting directly from the shaping of the maker coat 12. This patterned appearance makes it easy to distinguish the product 22 from the usual type of coated abrasive such as shown in Figures 1 and 2, or products such as fillet cloth or other prior known patterned-surface coated abrasives.

Figure 5:
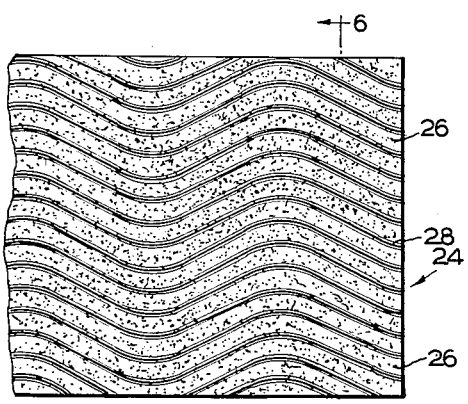
Figure 5 is a face view of another form of coated abrasive according to the present invention in which the grooves and lands run in parallel wavy lines.
Figure 6:
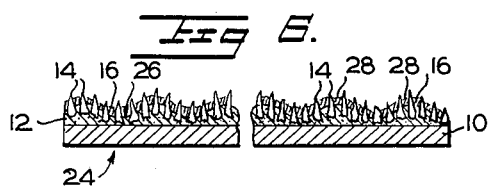
Figure 6 is an enlarged, fragmentary, cross-sectional view of the product of Figure 5 taken along the line 6—6 of Figure 5.

In the form of coated abrasive 24 illustrated in Figures 5 and 6, the grooves 26 and lands 28 exist as a series of parallel wavy lines in contrast to the straight lines of product 22. Otherwise, general characteristics and structure of product 24 is the same as product 22.

Referring now to Figure 7, a backing sheet 30 is fed from a roll 32 over guide rollers 34, 36, 38 and 40 to adhesive coating means 42. The coating means 42 consists of a tank 44 containing a bath of liquid or molten adhesive 46 into which dips the coating roller 48. The backing sheet 30 passes between the coating roller 48 and the back-up roller 50 and picks up a layer of adhesive on the surface facing the roller 48.

From the coating means 42 the sheet 30 passes to the adhesive layer shaping means 52 and which consists of a back-up roll 54 and a comb 56.

The details of mounting and operation of the shaping means 52 can be seen by reference to Figure 8. The back-up roll 54 is carried upon the shaft 58 which is journaled in the standards 60 and 62. Upright 64 on the standard 60 has an opening which receives the shaft 66 of the comb 56 with the spring 68 fitted around the shaft 66 and compressed between the extension 64 and the side 70 of the comb 56. The upright 72 on the standard 62 carries the shaft 74 of the comb 56. The cam 76 rides against the end of shaft 74 and rotation of the cam 76 causes the comb 56 to travel back and forth between uprights 64 and 72 to form the wavy pattern type of coated abrasive 24. Direct cam drives or other mechanical means may be used to oscillate the comb 56 in place of the cam 76 and spring 68.

From the adhesive shaping means 52, the sheet 30 passes to the abrasive grain distributing means 78, then over the hexagonal vibrating bar 79 to the reverse direction roller 80 which causes the loose grain to drop from the sheet into the collector 82. From here the sheet 30 passes over the guide roll 84 and then to drying ovens for subsequent treatments not shown.

Referring to Figure 9, although the comb 56 can be formed with teeth 86 of various sizes and shapes, the teeth 86 are preferably rectangular in shape and are of a preferred width "A" with a preferred space width "B" between them and a preferred height or depth "C." The desirable limits on the dimensions A, B and C are discussed later.

*Examples*

The following examples of actual production of products in accordance with the present invention serve to further illustrate the novel features of this development.

In these examples, all parts are by weight unless otherwise specified.

EXAMPLE 1

This example illustrates the production of coated abrasives having a cloth backing and aluminum oxide abrasive grain in both a usual form and in a form according to this present invention and shows the difference in grinding efficiencies between the standard and new type products.

Using a coated abrasive making machine generally standard in construction, but equipped with a doctor comb of the type shown in Figure 8, the following products were made:

| Product No. | Pattern |
| --- | --- |
| 1A | Straight groove. |
| 1B | Wavy groove—1″ wave length. |
| 1C | Wavy groove—2″ wave length. |
| 1D | None—(control). |

The comb had the following dimensions: tooth width "A"—0.078″; space width "B"—0.113″; and space depth "C"—0.045″. The comb was rendered inoperative during the processing of product 1D and was held motionless in working position when processing product 1A.

The materials and specifications used in the production of the products 1A to 1D were:

Backing sheet—brown cotton drills cloth (backfilled and sized)

Abrasive grain—50 grit fused aluminum oxide

Adhesives—

| | Maker Coat | | Size Coat—All Products |
| --- | --- | --- | --- |
| | Products 1A to 1C | Product 1D | |
| | Percent | Percent | Percent |
| 86 millipoise hide glue | 32 | 29.7 | 17.1 |
| Calcium carbonate filler | 32 | 29.7 | 34.2 |
| water | 36 | 40.6 | 48.7 |
| water soluble brown dye | trace | trace | trace |

Specifications—

| Product | Grain Weight | Maker coat+ backing wgt. |
| --- | --- | --- |
| | lbs./ream | lbs./ream |
| 1A | 40.1–41.6 | 49.6 |
| 1B | 40.1–41.6 | 49.6 |
| 1C | 40.1–41.6 | 49.6 |
| 1D | 40.1–41.6 | 34.4 |

The control (product 1D) was made using the maker adhesive employed for normal commercial production so that test results on the products could be satisfactorily evaluated. A thicker maker adhesive was used in forming products 1A to 1C in order that the grooves formed by the comb would remain in the adhesive layer until hardened. The maker adhesive of the control had a tendency to level out after shaping and to lose the pattern before hardening.

The coated abrasive products 1A and 1D were made by usual belt making procedures into 2½″ x 60″ belts and tested for grinding efficiency with the following results:

| Product | Severe Edge Test | Flat Test |
| --- | --- | --- |
| | Percent cut | Percent cut |
| 1A | 414 | 130 |
| 1B | 416 | 111 |
| 1C | 367 | 104 |
| 1D | 100 | 100 |

The "severe edge test" results are obtained using a testing method designed to determine shedding characteristics and cutting rate of the coated abrasive belt. The test is carried out on a bench grinder backstand assembly using a contact wheel of 7" diameter, 2½" face and 70 Durometer rubber. The workpiece used for testing the coated abrasive is hot rolled steel angle iron, SAE 1020, pieces 10¼" long, ⅛" thick and 1" wide on each angle face. The abrasive belts 2½" wide and 60" long are conditioned at 70° F. and 50% relative humidity for 48 hours before testing.

The test pieces are weighed before the start of the test and are then mounted to contact the abrasive belt along the ⅛ x 10¼" edge. The abrasive belt is placed on the bench backstand so that it runs with ¼" of the width of the belt unsupported, i. e. riding off the contact wheel, so that only 2¼" of the full width of the belt is on the contact wheel. This causes a severe flexing action of the unsupported portion of the abrasive belt as it engages the test piece.

With the belt running in this manner, the test piece is brought into contact with the belt with a dead weight force of about 5 to 10 pounds and is oscillated at constant speed back and forth across the belt.

After one minute of running of the piece in contact with the belt, the test piece is moved away from the belt and the workpiece withdrawn from the work holder and weighed. This testing procedure is then repeated at one-minute intervals until the end point of the test is reached. The loss of weight of the control material is taken as equal to 100% cut and the amount of the test piece removed by the other tested materials is then expressed in percent of the amount removed by the control belt.

The "flat test" is conducted using the same backstand assembly and contact wheel but in this case the 2½" belt is mounted on the contact wheel so that the entire belt is backed up by the wheel, i. e. there is no overhang of the belt over the edge of the wheel. The test angle iron is adjusted so that the face of the contact wheel makes an angle of 0° with the longitudinal axis of the test piece and the test piece is oscillated back and forth across the face of the wheel in contact with the belt during testing. Running of the belt in contact with the test piece for one-minute intervals and weighing in between as in the case of the severe edge test are carried out. The results are expressed in percent cut based upon comparison with the control coated abrasive as in the case of the severe edge test.

The calcium carbonate filler used in this and other examples described herein is of selected size as described and claimed in U. S. Patent 2,322,156 to N. E. Oglesby.

EXAMPLE 2

This example reports tests conducted to determine the possible effect upon the cutting efficiency of coated abrasives due to variation in the composition of the adhesive used in making the coated abrasive as compared with the effect upon cutting efficiency brought about by shaping of the adhesive layer in accordance with the present invention. The following products were made using the apparatus as described in Example 1:

| Product No. | Pattern |
| --- | --- |
| 2A | straight groove. |
| 2B | none—duplicating maker coat of 2A. |
| 2C | none—(control). |

The materials and specifications used in the production of the products 2A to 2C were:

Backing sheet—brown cotton drills cloth (backfilled and sized)
Abrasive grain—50 grit fused aluminum oxide Adhesives—

| | Maker Coat | | Size Coat—All Products |
| --- | --- | --- | --- |
| | Products 2A to 2B | Product 2C | |
| | Percent | Percent | Percent |
| 86 millipoise hide glue | 32 | 29.7 | 17.1 |
| Calcium carbonate filler | 32 | 29.7 | 34.2 |
| water | 36 | 40.6 | 48.7 |
| water soluble brown dye | trace | trace | trace |

Specifications—

| Product | Grain Weight | Maker coat+backing wgt. |
| --- | --- | --- |
| | lbs./ream | lbs./ream |
| 2A | 40.0–41.6 | 50.4 |
| 2B | 40.0–41.6 | 34.2 |
| 2C | 40.0–41.6 | 34.2 |

The product 2B with no patterned surface was made to determine what, if any, difference in grinding efficiency is caused by use of a thicker adhesive in the patterned product than for the control.

The products 2A to 2C were made into belts as in Example 1 and tested for grinding properties with the following results:

| Product | Severe Edge Test | Flat Test |
| --- | --- | --- |
| | Percent cut | Percent cut |
| 2A | 180 | 107 |
| 2B | 103 | 93 |
| 2C | 100 | 100 |

These results show that the difference in maker coat adhesive between products 2A and 2C has substantially nothing to do with the unique increase obtained in grinding efficiency observed for product 2A. This same fact would apply to the results obtained in Example 1.

EXAMPLE 3

This example reports the results of tests made to make a comparison of the cutting efficiency of coated abrasives patterned in accordance with the present invention and those having a patterned surface prepared in accordance with procedures described in U. S. Patent 2,108,645.

In carrying out the procedures of this example, a standard coated abrasive making machine was employed such as is diagrammatically illustrated in Figure 7 but in place of the solid surface coating roll 48, an embossed roll such as roll 4'', Figure 3, of U. S. Patent 2,108,645 was used. The raised portions on roll 21 in the case of this example were made of rubber and were shaped and sized in the case of production of a product designated 3A to be ⅛" wide and to form ribs of adhesive ⅛" in width with a bare space ⅛" in width between. In the case of the product designated 3B, the raised portions on the roll were ¼" in width with a ¼" space between designed to give ¼" ribs of adhesive running longitudinally with the backing sheet.

For the purpose of this example, no combing device 52 was employed in forming any products 3A to 3C. The apparatus used in forming product 3C was the same as that used in forming product 1D of Example 1.

Using the apparatus as indicated above, the following products were prepared:

| Product No. | Pattern |
| --- | --- |
| 3A | straight parallel ⅛" rib, ⅛" bare. |
| 3B | straight parallel ¼" rib, ¼" bare. |
| 3C | none—(control). |

The materials and specifications used in the making of products 3A to 3C were:

Backing sheet—brown cotton drill cloth
Abrasive grain—50 grit fused aluminum oxide
Adhesives—

|  | Maker Coat | Size Coat |
|---|---|---|
|  | *Percent* | *Percent* |
| 86 millipoise hide glue | 29.7 | 17.1 |
| calcium carbonate filler | 29.7 | 34.2 |
| water | 40.6 | 48.7 |
| water soluble brown dye | trace | trace |

Specifications—

| Product | Grain Weight | Maker coat+ backing wgt. |
|---|---|---|
|  | *lbs./ream* | *lbs./ream* |
| 3A | 27.3 | 16.5 |
| 3B | 28.4 | 17.2 |
| 3C | 40.1–41.6 | 34.4 |

The difference in grain and adhesive coat weights between these products results from the fact that products 3A and 3B have the bare 1/8" and 1/4" strips which are substantially uncoated with grain or adhesive.

The products 3A to 3C were made into belts as in Example 1 and tested for grinding properties with the following results:

| Product | Severe Edge Test | Flat Test |
|---|---|---|
|  | *Percent cut* | *Percent cut* |
| 3A | 32 | 111 |
| 3B | 39 | 104 |
| 3C | 100 | 100 |

These tests show that on the flat grinding type operation the products 3A and 3B may be considered equivalent to the control, but the patterned products 3A and 3B are greatly inferior to the control on severe grinding operations as shown by the severe edge test results.

EXAMPLE 4

This example reports results of tests conducted to determine the difference, if any, between the quantity of abrasive grains held in the grooves and the quantity of grains held in the lands of patterned coated abrasives prepared according to this invention. Two separate testing methods were employed for this purpose.

For the first method, a square was accurately marked off by masking tape so as to include an equal number of lands and grooves. A microscope was then adjusted and focused only upon the bottom of the depressions and by moving the material horizontally across the field of vision a physical count was made of those grains visible in that focus. The procedure was followed by refocusing of the instrument to the surface of the lands. These two counts were then compared. The whole process was repeated using a totally different area and the figures below represent an average of the counts.

Number of abrasive grains on lands—58
Number of abrasive grains in grooves—63

A determination by weight was also made with the aid of a special spade type tool .050" wide. By use of this tool an equal width of maker, grain and size was removed from both lands and grooves. The abrasive grain was separated by a washing procedure and after having been force dried was weighed upon a balance. Following are the weights as determined by this method.

Weight of abrasive grain on lands—0.5283 grams
Weight of abrasive grain in grooves—0.5733 grams The above results demonstrate that there is substantially no difference in quantity of abrasive grain held in the grooves and that held in the lands of products of this invention, the 10% or less differences noted in these test results being within limits of experimental error.

*Modifications and equivalents*

The examples given above illustrate the use of cloth backings in the formation of the new patterned-surface coated abrasives. This is the preferred type of backing for these new products since their increased grinding efficiencies find greatest use in grinding operations which generally employ cloth-backed coated abrasives. The usual cotton drills and jeans may be used as the backing although any other woven or non-woven cloth of natural or synthetic fibres may be used for this purpose. The cloth backings may be saturated, front or back sized, backfilled or otherwise treated as is well known in the art.

The usefulness of the invention is not limited to cloth backings and it may be employed in the formation of coated abrasives of any other known type backing material including paper, vulcanized fibre, fibre and cloth combinations, or the like. The backing sheets preferably have at least one plane surface on which the maker coat is applied, although it is possible to use backing sheets which are embossed, molded or otherwise formed with a shaped surface.

The composition of the adhesives used in forming the coated abrasives of this invention is not critical. The examples illustrate the use of high glue, modified by a special size calcium carbonate filler. However, any other type of adhesives known to the coated abrasive art may be used. For example, unmodified hide or bone glue, phenol-aldehyde resins, urea formaldehyde or other aminoplast type resins, alkyd resins, acrylic resins, starches and dextrins, are among the types of film-forming materials which may be used in making adhesives to carry out the new procedures.

Proportions of ingredients and modifying agents used in making the adhesives such as preserving agents, dyes or the like are a matter of choice as far as the process is concerned. However, as indicated in Example 1, it is preferable to have the adhesive of controlled consistency or viscosity so that when the adhesive layer is shaped by the comb or other means into the grooves and lands, the general configuration will be held until the adhesive layer has hardened. The desired consistency for any given machine can be determined quickly by simple trial.

Rotary discs, blasts of air from a nozzle or other means can be used in shaping the maker coat adhesive layers to provide the patterned coated abrasives of the invention. However, the preferred adhesive coat shaping means is a comb or grooved doctor blade of the general type illustrated in Figures 8 and 9. The adhesive shaping edge of such combs may have different configurations, e. g. rounded protrusions and slots, serrated edges or the like, but most satisfactory results have been found to be obtained with combs possessing rectangular teeth and rectangular inner spaces such as illustrated in Figure 9. Variations in the dimensions of the comb teeth and inner spaces are possible without adverse effect to the processes of the invention. However, it has been found that very noteworthy results are obtained when the rectangular teeth and inner space of the comb are sized dependent upon the abrasive grain grit size to be coated upon the abrasive grain grit size to be coated upon the shaped adhesive layer. The preferred sizes for comb teeth and spacings are given in the following table:

| Abrasive Grain Grit Number | Tooth Width "A" | Space Width "B" | Space Depth "C" |
|---|---|---|---|
| 24 to 36 | .075 to .085 | .11 to .12 | .04 to .05 |
| 40 to 80 | .045 to .055 | .07 to .08 | .025 to .035 |
| 100 and higher | .03 to .04 | .045 to .055 | .015 to .025 |

The width and depth figures are given in inches. The abrasive grain sizes are the grit number standards commonly recognized by the coated abrasive industry. The grit number sizes are not continuous because for example there is no standard grit size between 36 and 40 or between 80 and 100.

The new processes of this invention are generally applicable to formation of coated abrasives from abrasive grain of any size although the grinding efficiency increases brought about by the new procedures are most noticeable in coated abrasives having grit sizes between 24 and 180.

The reported examples illustrate the use of fused aluminum oxide as the abrasive grain in forming the new coated abrasives. However, the invention is equally useful with any other known type of abrasive grain including for example flint, garnet, emery, silicon carbide, diamond, spinel, boron carbide or the like.

The new coated abrasives may be made only with a marker coat, i. e. without a size coat, but they preferably comprise both a maker and size coat. The new processes may also be used with equal advantage in forming coated abrasives having a plurality of maker or size coats, or combinations, comprising pluralities of both maker and size coats, as well as a plurality of layers of abrasive grain. In the case of the "double-coated" type products, one or more of the maker coats can be shaped with grooves and lands in accordance with the new procedures.

The new products may be made with a wide variety of patterns. Straight, long waves, short zigzag patterns are all possible and the products may comprise two or more series of parallel grooves and lands forming crisscross patterns. The width and thickness of the grooves and lands may be varied, both between different products and in a single product. Thus, a pattern may comprise grooves and lands of varied widths or varied thickness. However, the most desirable products appear to be those made with pattern in which the grooves are all about the same width and thickness and the lands are all about the same width and thickness.

It has been found that about 3 to 30 lands per inch deposited in the maker adhesive yields very satisfactory patterned coated abrasives. The number of ribs will vary with the product desired, and depends to some extent on its function or use. This number is also dependent upon the regularity or irregularity of the pattern as well as the grit size, number and fracture. For patterns having grooves and lands all about the same size, the preferred products have grooves and lands of such size that the distance between the mid-points of the lands is of the order of 0.05 to 0.3 inch.

Aside from the comb or slotted doctor blade section, any known standard apparatus may be used in the formation of the new coated abrasives. This will include coating apparatus with a roller coat or doctor blade or other adhesive layer applying equipment and various types of abrasive grain applying equipment such as gravity feeds, upside-down electrostatic coating means, and grain orienting equipment such as vibrator bars or the like. Furthermore, aside from the use of adhesive with preferred viscosity to retain the shaped pattern or contour, the conditions, e. g. coating temperatures, oven temperatures and the like, standard for the art may be employed in carrying out the new procedures. Actually, the very simple modifications of known equipment and substantially unchanged usual operating conditions which may be used with the new procedures is a distinct advantage of the invention. Thus, the decided improvements in grinding efficiencies and operation of the coated abrasives formed according to the process can be realized without need of resorting to expensive equipment or composition changes.

The new patterned-surface coated abrasives of this invention may be used in the operations for which coated abrasives are known to be useful. For example, they may be cut or otherwise shaped into discs, sheets, cones, pencils, bobs, points or the like, or they may be fabricated into belts, drum covers, strips, slotted discs or any other shape required for the utilization of coated abrasives.

Conclusion

New processes for the formation of patterned-surface coated abrasives have been disclosed and described in detail along with a general description of apparatus and conditions used in carrying out such new processes.

The new patterned-surface coated abrasives can be made with only minor changes to existing equipment and to normal specifications for grain and adhesive weights and the like now generally employed in the coated abrasive manufacture art. As a result, by the new processes it is possible to make patterned coated abrasives which possess substantially the same or comparable amounts of abrasive grain per ream as standard unpatterned material and yet possess a unique increase in cutting efficiency for a given grit size and adhesive coat.

I claim:

1. A patterned-surface coated abrasive article comprising a substantially plane surfaced backing sheet, a continuous adhesive maker coat covering the plane surface of the backing sheet, said maker coat having therein at least one series of narrow parallel grooves and at least one series of narrow lands between the grooves, and abrasive grain uniformly embedded in said maker coat with no appreciable difference in orientation, size, and quantity of the grain held in the grooves and the grain held in the lands.

2. A coated abrasive as claimed in claim 1 wherein the grooves are all about the same width and all about the same thickness and said lands are all about the same width and all about the same thickness.

3. A patterned-surface coated abrasive comprising a plane surfaced, fibrous web backing sheet, a continuous adhesive maker coat covering a side of the backing sheet, said maker coat being patterned into a series of narrow grooves, the locus of the mid-points of grooves being lines which all lie approximately in the same plane and run parallel to one another, and a series of narrow lands between the grooves, the locus of the mid-points of said lands being lines which all lie in approximately the same plane above said first-mentioned plane and run parallel to one another, abrasive grain uniformly embedded in said maker coat substantially uniformly distributed across the entire area thereof and a continuous adhesive size coat surrounding said abrasive grain and covering said maker coat, the size coat being more uniform in thickness throughout the coated abrasive than said maker coat and the orientation and size of said abrasive grain held in said grooves having no appreciable difference to the orientation and size of the abrasive grain held in said lands.

4. A coated abrasive as claimed in claim 3 wherein said mid-point lines are wavy lines which run longitudinally of the coated abrasive.

5. A coated abrasive as claimed in claim 3 wherein the number of lands per inch of coated abrasive surface is between about 3 and 30.

6. A process for the production of a patterned-surface coated abrasive which comprises applying a continuous layer of adhesive over the surface of a backing sheet, shaping said layer into a parallel series of narrow width groove portions of given thickness alternating with a series of land portions without destroying the continuity of said layer, applying abrasive grain substantially uniformly over the entire shaped adhesive layer, and then hardening said adhesive to fasten the abrasive grain to the backing sheet.

7. A process for the production of a patterned-surface coated abrasive which comprises applying a continuous layer of adhesive over a surface of a backing sheet, combing said adhesive layer into a series of grooves and lands without destroying the continuity of the layer, applying abrasive grain substantially uniformly over the entire combed adhesive layer and then hardening said adhesive to fasten the abrasive grain to the backing sheet.

8. A coated abrasive comprising a substantially plane surfaced backing sheet, a continuous adhesive maker coat covering the plane surface of the backing sheet and a continuous, uniform covering of abrasive grain uniformly embedded in said maker coat, the coated abrasive presenting a patterned surface due solely to a series of grooves and lands formed in said adhesive maker coat.

9. A patterned surface coated abrasive comprising a substantially plane surfaced backing sheet, a continuous adhesive maker coat covering the plane surface of the backing sheet, said maker coat having a series of narrow parallel grooves and lands therein and abrasive grain uniformly embedded in said maker coat, the orientation, size and quantity of said grain being substantially uniform across the entire surface of the coated abrasive so that the coated abrasive presents a patterned surface due solely to the grooving of the maker coat.

References Cited in the file of this patent

UNITED STATES PATENTS

| | | |
|---|---|---|
| 875,936 | Sandis | Jan. 7, 1908 |
| 1,518,988 | Lehon | Dec. 9, 1924 |
| 1,657,784 | Bergstrom | Jan. 31, 1928 |
| 1,941,362 | Newcomb | Dec. 26, 1933 |
| 1,988,065 | Jooddell | Jan. 15, 1935 |
| 2,104,384 | Harris | Jan. 4, 1938 |
| 2,250,482 | Harshberger | July 29, 1941 |
| 2,277,520 | Martin et al. | Mar. 24, 1942 |
| 2,400,746 | Fassiotto et al. | May 21, 1946 |
| 2,426,441 | Dornsfield | Aug. 26, 1947 |

FOREIGN PATENTS

| | | |
|---|---|---|
| 613 | Great Britain | Mar. 9, 1859 |